US 11,913,968 B2

(12) United States Patent
Porte

(10) Patent No.: US 11,913,968 B2
(45) Date of Patent: Feb. 27, 2024

(54) AUTOMATIC LIQUID DENSITY MEASUREMENT DEVICE

(71) Applicant: COMMISSARIAT A L'ENERGIE ATOMIQUE ET AUX ENERGIES ALTERNATIVES, Paris (FR)

(72) Inventor: Florian Porte, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/450,495

(22) Filed: Oct. 11, 2021

(65) Prior Publication Data

US 2022/0113237 A1    Apr. 14, 2022

(30) Foreign Application Priority Data

Oct. 12, 2020 (FR) .................................... 20 10390

(51) Int. Cl.
| | |
|---|---|
| *G01N 9/14* | (2006.01) |
| *G01F 23/263* | (2022.01) |
| *G01F 23/28* | (2006.01) |
| *G01F 23/70* | (2006.01) |

(52) U.S. Cl.
CPC ............. *G01N 9/14* (2013.01); *G01F 23/265* (2013.01); *G01F 23/28* (2013.01); *G01F 23/706* (2013.01)

(58) Field of Classification Search
CPC ......... G01N 9/14; G01F 23/265; G01F 23/28; G01F 23/706
USPC ........................................................ 73/32 R
See application file for complete search history.

(56) References Cited

U.S. PATENT DOCUMENTS

| | | | |
|---|---|---|---|
| 3,010,319 A * | 11/1961 | Sontheimer | ........... G01F 23/263 324/671 |
| 3,921,461 A | 11/1975 | Layton | |
| 5,900,547 A | 5/1999 | Bartkiewicz | |
| 8,011,225 B2 * | 9/2011 | Forkosh | .............. G01F 23/2921 62/271 |

(Continued)

FOREIGN PATENT DOCUMENTS

| | | |
|---|---|---|
| CN | 105675437 A | 6/2016 |
| GB | 2 013 900 A | 8/1979 |

OTHER PUBLICATIONS

French Preliminary Search Report dated Jun. 21, 2021 in French Application 20 10390 filed on Oct. 12, 2020, 2 pages (with English Translation of Categories of Cited Documents).

*Primary Examiner* — John Fitzgerald
(74) *Attorney, Agent, or Firm* — Oblon, McClelland, Maier & Neustadt, L.L.P.

(57) ABSTRACT

An automatic liquid density measurement device includes a receptacle configured to contain the liquid, a float configured to be submerged in the liquid when it is contained in the receptacle, and an electronic system. The electronic system includes a first electromagnetic sensor configured to make a reference measurement relative to the electrical properties of the liquid, a second electromagnetic sensor configured to make a measurement of the volume of the liquid displaced when the float is submerged in the liquid, and an electronic circuit coupled with said first and second electromagnetic sensors to determine the density of the liquid based on the measurement of the physical properties of the liquid and the measurement of the volume of the liquid displaced.

16 Claims, 6 Drawing Sheets

(56) References Cited

U.S. PATENT DOCUMENTS

| | | | |
|---|---|---|---|
| 10,379,023 B2* | 8/2019 | Garrido Garza | G01N 9/14 |
| 2009/0277264 A1 | 11/2009 | Forkosh | |
| 2020/0072720 A1 | 3/2020 | Olk | |
| 2021/0096098 A1* | 4/2021 | Scaboo | C12M 41/48 |
| 2022/0194829 A1* | 6/2022 | Perrier | C12M 41/42 |
| 2023/0324269 A1* | 10/2023 | Bihday | G01N 9/14 |
| | | | 73/32 R |

* cited by examiner

AUTOMATIC LIQUID DENSITY MEASUREMENT DEVICE

TECHNICAL FIELD

The present invention relates to the field of liquid density measurement associated with at least another measurement.

PRIOR ART

In numerous industrial, environmental, and medical fields, it is sought to measure the density of a liquid. This is particularly the case in the pharmaceutical, petrochemical, electrochemical, agri-food industries, etc.

For example, there is a need to measure the density of a liquid to check batteries or machining oils, to check the quality of consumable liquids (wine, cider, beer, milk, oils, etc.), to analyse medical parameters (analysis of blood, urine, etc.), to analyse water in water treatment plants, or for oceanographic analyses, producing medicinal products (bioreactor), etc.

There are several kinds of liquid density measurement devices. There are, for example, manual densimeters which are used extensively in various sectors of activity. The dimensions and weight thereof define the measurement range and precision. However, they require sampling operations and the operations are entirely manual.

There are electronic densitometers which measure the oscillation frequency of U-shaped tubes which vary according to the mass of the liquid sampled. These apparatuses are expensive and sensitive to certain disturbances (fouling, bubbles). In some cases, they enable "online" but not "in situ" measurement.

There are also apparatuses which determine the density of a liquid by measuring the refractive index. However, the measurement can be disrupted by the presence of gas (for example, $CO_2$) or fouling of the sensor.

Mention will furthermore be made of the document U.S. Pat. No. 3,921,461 describing a hydrometer including a first float entirely submerged in the liquid and a second reference float partially submerged in the liquid whereby the relative vertical positions of the two floats make it possible to determine the density of the liquid. However, the density measurement made using this device can be affected by physical properties of the liquid thus reducing the measurement precision. Furthermore, it requires two floats to make an indirect liquid density measurement.

Thus, the aim of the present invention is that of remedying the aforementioned drawbacks by proposing a device for measuring the density of a liquid in real time precisely, directly and automatically while making it possible to provide additional measurements on the properties of the liquid.

DESCRIPTION OF THE INVENTION

The invention relates to an automatic liquid density measurement device, including:
- a receptacle intended to contain said liquid (the density of which is to be measured),
- a float intended to be partially submerged in said liquid when it is contained in the receptacle, and
- an electronic system including:
  - a first electromagnetic sensor configured to make a reference measurement relative to the electrical properties of the liquid, (conductivity, permittivity)
  - a second electromagnetic sensor configured to make a measurement of the volume of liquid displaced when the float is submerged in the liquid, and
  - an electronic circuit coupled with said first and second electromagnetic sensors to determine the density of the liquid based on the measurement of the physical properties of the liquid and the measurement of the volume of the liquid displaced, the physical properties including the conductivity and permittivity of the liquid.

The mass of the float being known, the measurement of the volume of the liquid displaced provides an estimation of the density of the liquid and the reference measurement makes it possible to correct the estimation of this density thus automatically generating a very precise value of the density of the liquid.

Advantageously, each of the electromagnetic sensors includes a resonator having a resonance frequency which is dependent on the environment thereof, said resonator comprising an active (capacitive or inductive) reactance in the form of electrode(s), said reactance electrode(s) associated with a corresponding passive coupling element.

Thus, each sensor helps provide information on the nature and the density of the liquid automatically.

According to a specific embodiment, the first and second reactance electrodes are capacitive electrodes formed by first and second armature pairs respectively.

Advantageously, the measurement device further includes third and fourth sensors comprising third and fourth reference electrodes respectively.

According to a specific embodiment, the third and fourth reactance electrodes are inductive electrodes formed by first and second coils respectively.

Advantageously, the measurement device includes at least one temperature probe.

According to a first embodiment, the first and second electromagnetic sensors include first and second reactance electrodes respectively, said first and second reactance electrodes are disposed on the lateral surface of the receptacle. The first reactance electrode is disposed at the bottom of the receptacle and the second reactance electrode is disposed at the neck of the receptacle. The first electromagnetic sensor is configured to make a reference measurement. The second electromagnetic sensor is configured to make a first measurement of the level of the liquid in the receptacle in the absence of the float and to make a second measurement of the level of the liquid in the receptacle when the float is submerged in the liquid.

This instrumentation of the receptacle is very easy to implement and makes it possible to make very precise measurements.

Advantageously, the third and fourth reactance electrodes are disposed on the lateral surface of the receptacle at intermediate levels between the first and second reactance electrodes.

These third and fourth reactance electrodes make it possible to increase the precision of the density measurement or of the additional measurements further.

Advantageously, the receptacle is made of an insulating material such as for example a glass beaker consisting of a graduated vertical cylinder, with flat bottom and high edge.

According to a second embodiment, said electronic system further includes an antenna and a battery and at least a part of the electronic system is integrated in the float.

Advantageously, the float plunger incorporates a battery and the first electromagnetic sensor, and the float rod incorporates the antenna and the second electromagnetic sensor.

Advantageously, the measurement device includes a motion sensor configured to measure the motion of the float and indirectly that of the liquid.

Advantageously, the plunger includes in the lower part thereof a magnet making it possible to set the float in motion in order to stir the liquid.

Advantageously, according to the needs of the application, the measurement device can include at least one further sensor adapted to measure chemical properties of the liquid (for example, pH, dissolved O2, dissolved CO2, Redox potential, etc.).

Advantageously, the measurement device includes a calibration and inductive charging module intended to calibrate the float and to remotely charge the battery integrated in the float, said calibration and inductive charging module being capable of being comprised in a protective case of the float.

According to a third embodiment, the measurement device includes a cover intended to be placed on the opening of the receptacle. The cover comprises a tubular opening intended to allow a part of the float rod through so as to enable a remote power supply. The second sensor is disposed on the tubular opening and the rod is at least partially metallised.

The invention also relates to an automatic liquid density measurement method, including the following steps:
  making a measurement when empty,
  pouring said liquid into a receptacle,
  using a first electromagnetic sensor to make a reference electromagnetic measurement relative to the electrical properties of the liquid contained in the receptacle,
  using a second electromagnetic sensor to make a first electromagnetic measurement of the level of the liquid in the receptacle,
  introducing a float into said liquid contained in the receptacle,
  using the second sensor to make a second electromagnetic measurement of the level of the liquid in the receptacle, and
  using a microprocessor to determine the density of the liquid according to the measurement of the physical properties of the liquid and the first and second level measurements, the physical properties including the conductivity and permittivity of the liquid.

According to an embodiment, the first and second electromagnetic sensors are disposed on the receptacle.

According to a further embodiment, the first and second electromagnetic sensors are integrated in the float, the method further including:
  inductive charging and self-calibration of the float,
  a stabilisation measurement of the liquid by a motion sensor integrated in the float, and
  determination of the density of the liquid by the microprocessor after the liquid has stabilised.

Further advantages and features of the invention will emerge in the non-limiting detailed description below.

BRIEF DESCRIPTION OF THE FIGURES

Embodiments of the invention will now be described, by way of non-limiting examples, with reference to the appended drawings, wherein.

DESCRIPTION OF EMBODIMENTS

The principle of the invention is that of automatically determining the density of a liquid using electromagnetic measurements made directly on the liquid by means of a float partially submerged in this liquid.

Figure 1:
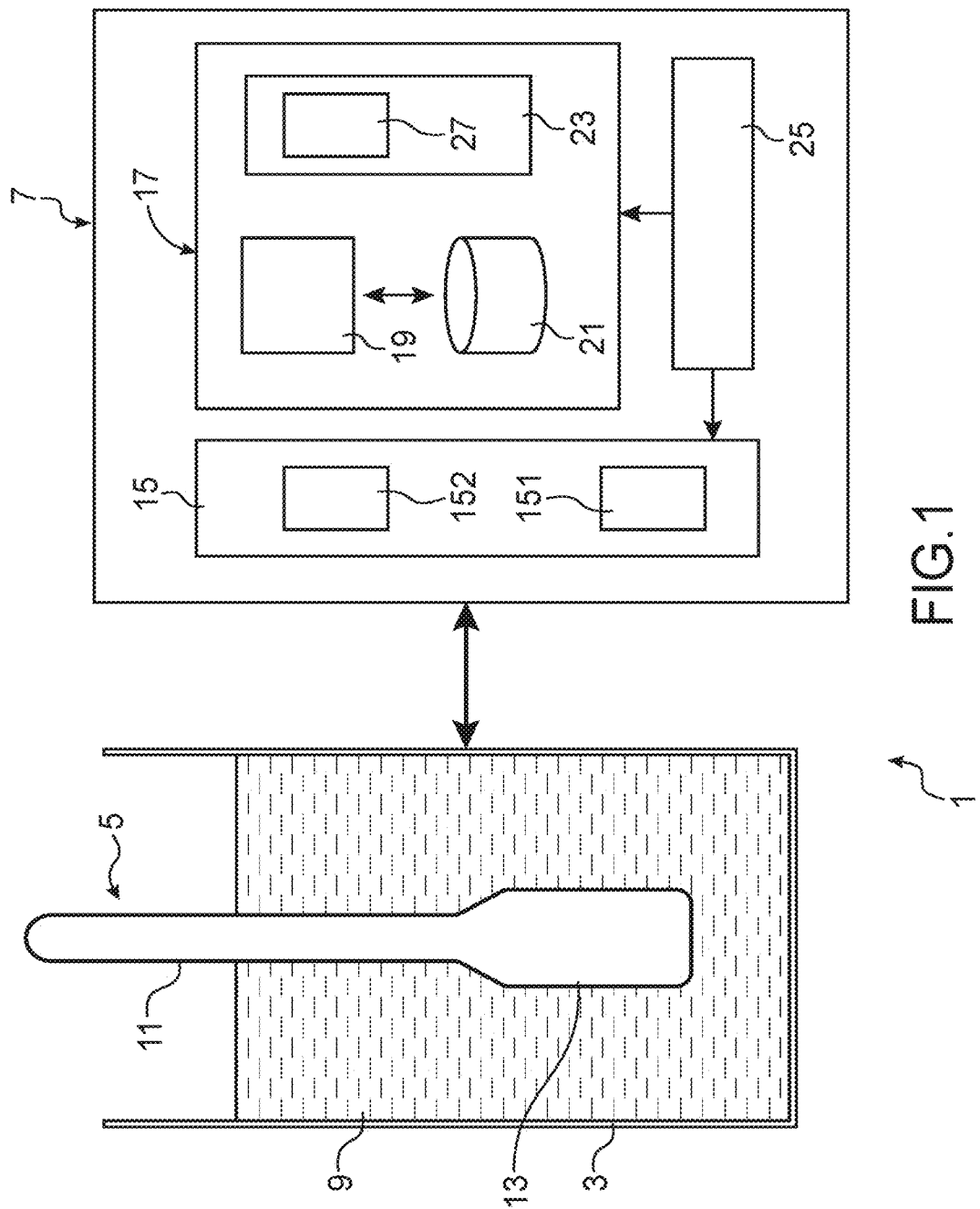
FIG. 1 illustrates very schematically an automatic liquid density measurement device, according to an embodiment of the invention.

FIG. 1 illustrates very schematically an automatic liquid density measurement device, according to an embodiment of the invention.

The measurement device 1 includes a receptacle 3, a float 5 and an electronic system 7.

The receptacle 3 is intended to contain the liquid 9 the density of which is to be measured. It is made of an insulating material such as for example glass. It has known sectional characteristics and can for example be in the form of a graduated vertical cylinder, with flat bottom and high edge such as a beaker. It will be noted that the receptacle can also be formed from a glass cell culture or fermentation vessel or any other receptacle.

The float 5 of a predetermined mass according to the desired measurement range is optionally equipped with a rod 11 extending upwards and a plunger 13 intended to make it partially submerge and to ensure the verticality thereof in the liquid 9 when it is contained in the receptacle 3.

The electronic system 7 includes electromagnetic sensors 15 (at least two sensors 151, 152) as well as an electronic circuit 17 coupled with the electromagnetic sensors 15. The electronic circuit 17 includes a microcontroller or microprocessor 19, a memory 21 and an input/output interface 23. Furthermore, the electronic system 7 includes a power management module 25 comprising a battery or other electrical power supply means. The electronic system 7 can be located either on the receptacle 3, inside the float 5, or on an intermediate part (for example cover) according to different embodiments described in more detail.

Each electromagnetic sensor 15 includes an inductive-capacitive circuit LC establishing a resonator having a specific resonance frequency which is dependent on the resonator environment. The resonance frequency varies according to the level (i.e. liquid/air interface) of the liquid 9 in the receptacle 3 and the nature thereof. The measurement by an electromagnetic sensor 15 of this resonance frequency also provides information on the nature and the configuration of this environment.

A first electromagnetic sensor 151 is configured to make a reference measurement relative to the physical properties of the liquid 9 and more particularly, to the electrical properties such as the conductivity and permittivity of the liquid 9 contained in the receptacle 3.

A second electromagnetic sensor 152 is configured to make a measurement of the volume of liquid displaced when the float 5 is submerged in the liquid 9. Given that the float 5 has a constant known mass, the volume of liquid displaced by this float 5 is representative of the density of the liquid.

The microprocessor 19 is configured to determine the density of the liquid 9 on the basis of the measurement of the volume of the liquid displaced made by the second sensor 152 and the measurement of the electrical properties of the liquid made by the first sensor 151.

Indeed, the microprocessor estimates the value of the density of the liquid based on the volume of the liquid displaced by the float and the mass of the float 5. Furthermore, the measurement of the electrical properties of the liquid 9 made by the first sensor 151 is a reference measurement which enables the microprocessor 15 to correct the first estimation and determine the density of the liquid 9 with a very high precision.

The density determined by the microprocessor 19 is advantageously transmitted by a digital link (wired or wireless) by the input/output interface 23 to the user to be displayed on a display screen 27. Furthermore, a log of the different results can be saved in a memory 21.

Advantageously, according to the needs of the application, the measurement device can include sensors adapted to measure chemical properties of the liquid. For example, the measurement device can include a pH measurement sensor, measurement sensors of the gases ($O_2$, $CO_2$) dissolved in the liquid, a Redox potential measurement sensor, etc.

Figure 2:
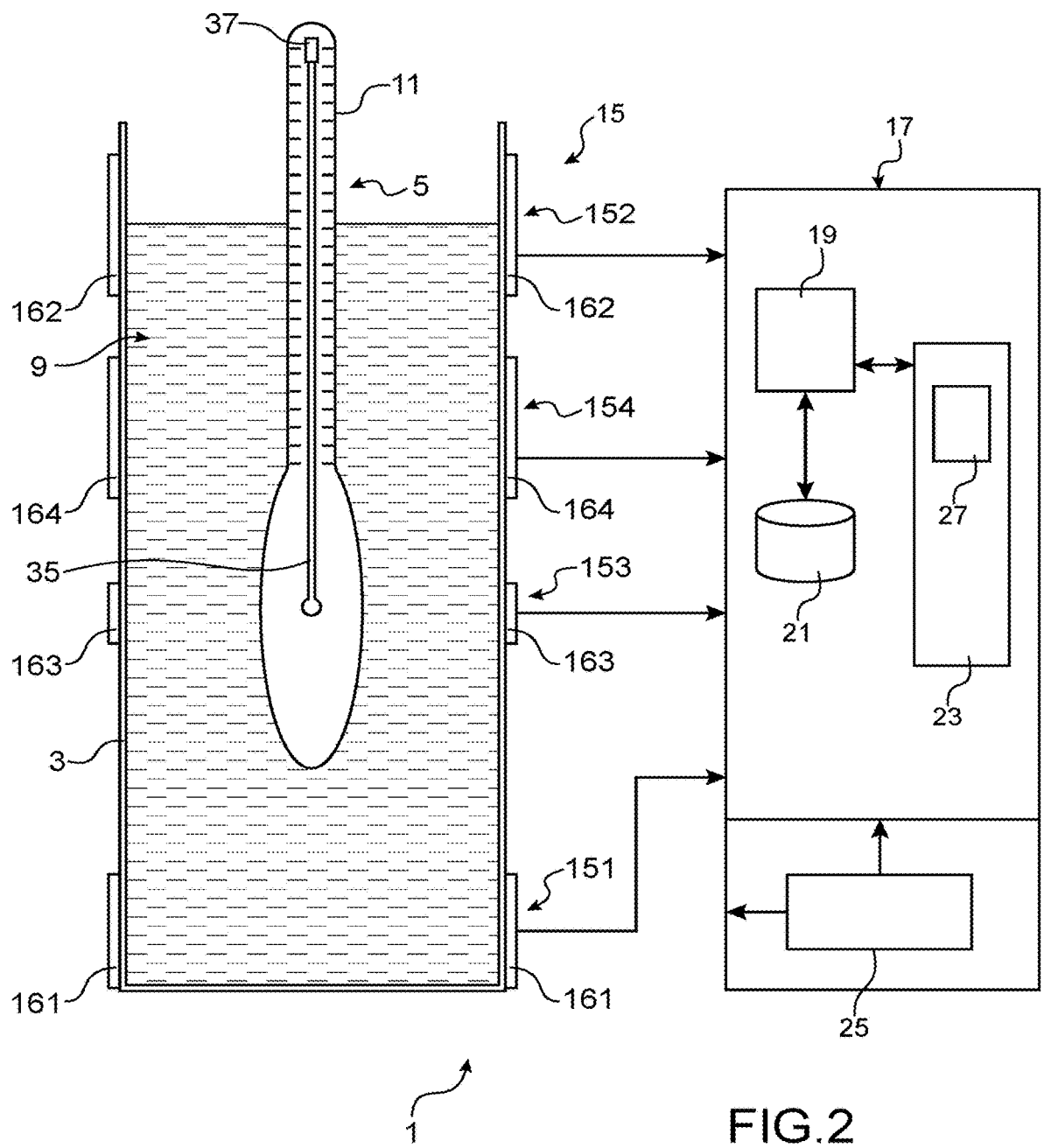
FIG. 2 illustrates very schematically an automatic liquid density measurement device, according to a first preferred embodiment of the invention.

FIG. 2 illustrates very schematically an automatic liquid density measurement device, according to a first preferred embodiment of the invention.

The electronic system comprising all the elements (i.e. electromagnetic sensors 15, microcontroller or microprocessor 19, memory 21, input/output interface 23, and power management module 25) is integrated in the receptacle 3. Alternatively, only a part of the electronic system (comprising at least the electromagnetic sensors 15) is integrated in the receptacle as illustrated in FIG. 2.

Thus, according to this first embodiment, the receptacle 3 is instrumented by the arrangement of at least two electromagnetic sensors 151, 152 on the surface thereof. Each of the sensors 15 includes a resonator which comprises an active reactance in the form of electrode(s), said reactance electrode(s) associated with a corresponding passive coupling element. The reactance electrode can be capacitive or inductive type. In particular, if this electrode is capacitive type, then the corresponding coupling element is inductive type and conversely, thus forming a resonator wherein the resonance frequency varies according to the level and nature of the liquid 9 contained in the receptacle 3.

Advantageously, the reactance electrodes of the different electromagnetic sensors 15 are disposed on the lateral surface of the receptacle 3.

A first reactance electrode 161 of a first sensor 151 is disposed on the lateral surface and at the bottom of the receptacle 3. Thus, this first reactance electrode 161 is not affected by the level of the liquid 9 in the receptacle 3 and hence enables the first sensor 151 to make a reference measurement by measuring the electrical properties for example, the permittivity and the conductivity of the liquid 9.

Furthermore, a second reactance electrode 162 of a second sensor 152 is also disposed on the lateral surface but at the neck of the receptacle 3 and more particularly, in the zone of any air-liquid interface. The second electromagnetic sensor 152 is configured to make a first measurement of the level of the liquid 9 in the receptacle 3 in the absence of the float 5 (i.e. without the float 5 being submerged in the liquid 9) and to make a second measurement of the level of the liquid in the receptacle 3 when the float 5 is submerged in the liquid 9. Thus, the second sensor 152 is adapted to measure essentially the level of the liquid, i.e. the level of the air-liquid interface. The difference in the values between the first and second measurements made by the second sensor 152 is representative of the upward displacement of the liquid (i.e. the variation of the level of the liquid) due to submerging the float 5.

For example, the first 161 and second 162 reactance electrodes of the first 151 and second sensors 152 are capacitive electrodes formed by first and second armature pairs respectively. In this case, the corresponding coupling elements are inductive elements (not illustrated).

For example, the third 163 and fourth 164 reactance electrodes of the third 153 and fourth 154 sensors are inter-digitated capacitive electrodes which can provide additional information on the nature of the liquid in the vicinity of the wall. The corresponding coupling elements are here also inductive elements (not illustrated).

Advantageously, according to a specific embodiment, the oscillators formed by the third lower sensors 151, 153 and 154 of which the electrodes are disposed to be fully submerged are dimensioned so as to have different resonance frequencies. Indeed, the permittivity of the liquid can vary according to the frequency. Thus, by dimensioning the oscillation frequencies of these three sensors 151, 153 and 154 to cover a sufficiently wide frequency range to include the frequency range of the upper sensor 152 (partially submerged), it is possible to correct the density value with the permittivity value corresponding to the frequency of the sensor 152. This permittivity value can then be calculated by interpolation based on the measurements of the three lower sensors 151, 153 and 154.

Figure 3:
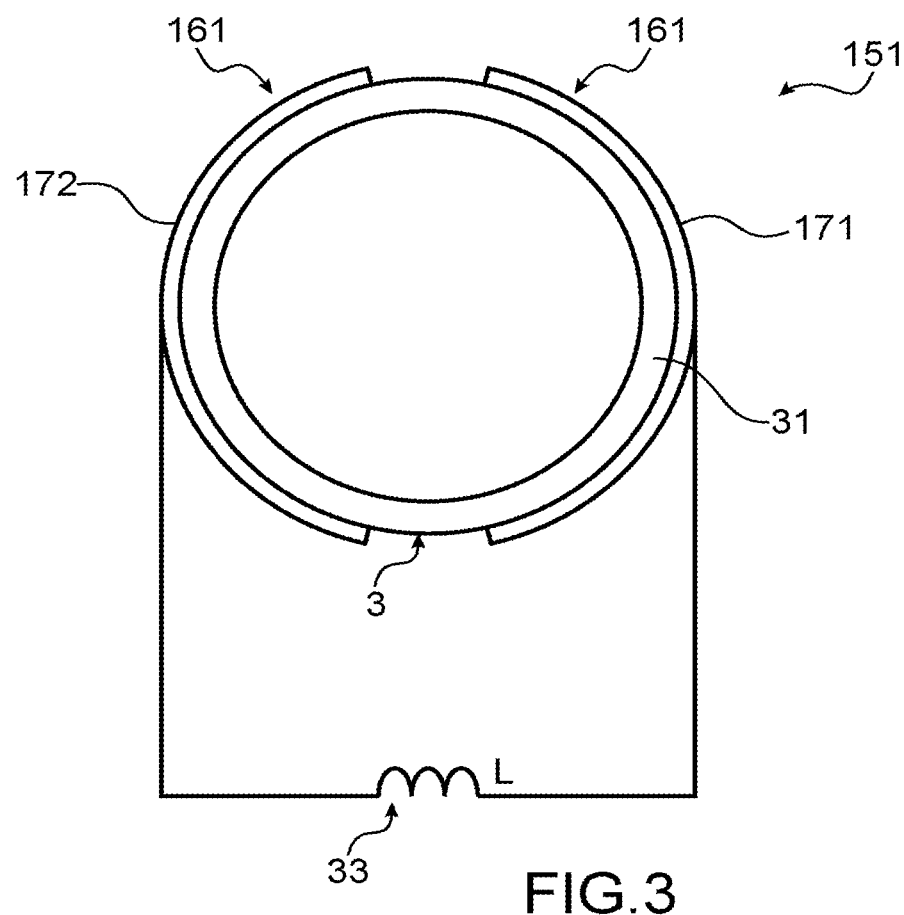
FIG. 3 illustrates very schematically the arrangement of an electromagnetic sensor on the lateral surface of the receptacle, according to the embodiment in FIG. 2.

FIG. 3 illustrates very schematically the arrangement of a capacitive electromagnetic sensor on the lateral surface of the receptacle, according to the embodiment in FIG. 2.

For example, the first electromagnetic sensor 151 is considered. The reactance electrode 161 of the sensor 151 includes two conductive armatures 171 and 172 disposed facing one another on the outer surface of the receptacle 3 by moulding the cylindrical shape of this surface. Thus, a tubular shaped capacitor is formed by the two armatures 171, 172 separated from one another by a dielectric formed by the insulating walls 31 of the receptacle 3 as well as by the nature of the fluid in the receptacle 3 at the levels of the armatures 171, 172. It is noted that, alternatively, the conductive armatures 171 and 172 of the sensor can be inter-digitated.

Given that the geometry of the capacitor is invariable, the capacitance C thereof is essentially dependent on the nature of the dielectric and more specifically on the nature and composition of the fluid contained in the receptacle 3 between the armatures 171, 172.

Furthermore, the armatures 171, 172 of the capacitor of capacitance C are connected to an inductance that can be a coil 33 of predetermined inductance L, thus forming a resonance circuit wherein the frequency is dependent on the capacitance C which can be variable and the inductance L which is constant. The electromagnetic sensor 151 measures the resonance frequency thus enabling the microprocessor 19 to infer the value of the capacitance C and hence, the permittivity of the fluid in the case where the fluid contained in the receptacle 3 fills the space between the armatures 171, 172.

Thus, for the second electromagnetic sensor 152 wherein the armatures are disposed (when a liquid is contained in the receptacle 3) at the air-liquid interface, the variation of the resonance frequencies between the first measurement and the second measurement is indicative of the variation of the permittivity of the insulator between the armatures due to the displacement of the air-liquid interface. It will be noted that the relative permittivity of a liquid with respect to air is quite significant. For example, the relative permittivity of water with respect to air is of the order of 80. Thus, the proportion of the liquid 9 in the insulator between the armatures affects the capacitance of the capacitor substantially. In particular, introducing the float 5 into the liquid 9 increases the level of the liquid which hence increases the capacitance generating a reduction in the resonance frequency.

On the other hand, for the first electromagnetic sensor 151 disposed at the bottom of the receptacle 3, when a liquid 9 is contained in the receptacle 3, there is no air-liquid interface at the armatures and hence, the resonance frequency measured is only indicative of the nature and, in particular, the permittivity of the liquid 9.

Knowing the mass of the float 5, the microprocessor 19 can then estimate the value of the density of the liquid 9 based on the variation of the level of the liquid which is proportional to the volume of the liquid displaced by the float 5. Furthermore, the measurement of the electrical properties of the liquid 9 made by the first sensor 151 is a reference measurement which enables the microprocessor 19 to correct the first estimation and determine the density of the liquid 9 with greater precision.

Advantageously, the receptacle 3 includes further electromagnetic sensors. For example, it includes third 153 and fourth 154 electromagnetic sensors comprising third 163 and fourth 164 reactance electrodes respectively, disposed on the lateral surface of the receptacle 3 at intermediate levels and according to different heights, between the first 161 and second 162 reactance electrodes.

For example, the third 163 and fourth 164 reactance electrodes are inductive electrodes formed by first and second coils respectively. These intermediate reactance electrodes will also be influenced by the position of the float 5 helping increase the precision of the density measurement of the liquid 9 further.

According to a further example, in the case where the permittivity of the liquid is dependent on the frequency, the third 163 and fourth 164 sensors can serve as references in addition to the second sensor 162 so as to estimate the progression of the permittivity of the liquid. This estimation can be conducted on a frequency range corresponding to the operating range of the first sensor 161 (for example, by three-point impedance spectroscopy). The frequencies of these sensors can be adjusted by varying the size of the electrodes and the value of the associated inductance.

It will be noted that the sensitivity of the sensors can be adjusted according to the needs of the desired application. More specifically, the choice of the sensitive part (inductive or capacitive), the geometry of the capacitive armatures (cylindrical, inter-digitated, etc.) and the coils (cylindrical, planar, etc.) make it possible to adjust the sensitivity of each sensor to the value of the parameter to be measured. For example if it is sought to increase the measurement sensitivity in the vicinity of the wall, a capacitive sensor with an electrode consisting of two inter-digitated armatures may be preferred. In this way, the level measurement may be more or less sensitive to the meniscus value.

The assembly described below was produced with four electromagnetic sensors 151-154 wherein the sensitive parts are formed either by armature pairs 161, 162 or by coils 163, 164.

Each sensor is sensitive both to the electrical properties and to the level of liquid before and after adding the densimeter. The position and geometry of each sensitive part are advantageously determined according to the measurement range sought.

In the case where the variations of the parameters of influence are sufficiently reduced, the relationships between the frequencies measured and each parameter can be considered to be linear. In this case, an algorithm using matrix inversion can then provide indicators on the volume, permittivity, conductivity in addition to the density value based on the resolution of a system of four equations with four unknowns described in an example in more detail.

For more extensive ranges, an algorithm combining matrix inversion and polynomial interpolations can be established with more calibration points for example, by varying the position of the float 5 in a controlled manner with a specific bench.

Figure 4:
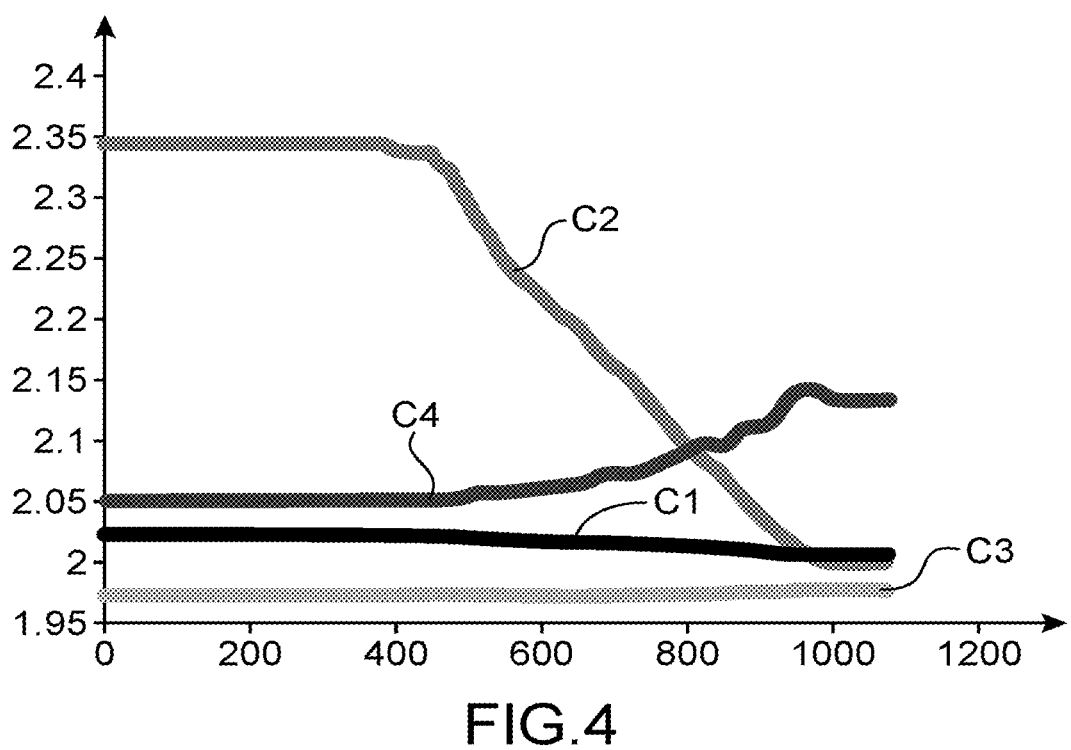
FIG. 4 illustrates graphs indicating the sensitivity of the different electromagnetic sensors, according to the first embodiment of the invention.

FIG. 4 illustrates graphs indicating the sensitivity of the different electromagnetic sensors.

In particular, these measurements correspond to an embodiment where the sensors 151 and 152 are capacitive and the sensors 153 and 154 are inductive.

The y-axis represents the frequency in MHz and the x-axis represents the acquisition number at a frequency of 50 Hz. According to this example, the frequencies of the electromagnetic sensors 151-154 are varied by manually adding saline water into the receptacle 3 in the presence of the float 5.

It is observed in the graphs that the sensitivities are very different according to the configuration of the electromagnetic sensors 151-154.

The curve C1 shows that the capacitive sensor 151 placed at the bottom is essentially sensitive to conductivity and permittivity variations. Indeed, the curve C1 indicates a slight reduction in the frequency relative to the capacitive sensor 151 associated with the increase in conductivity.

The curve C2 shows that the inter-digitated armature capacitive sensor 152 placed at the air-liquid interface is very sensitive to the level of the liquid and to a lesser degree to the conductivity and permittivity. The substantial reduction in the frequency relative to the capacitive sensor 152 is mainly linked with the increase in the level of the liquid and to a lesser degree to an increase in conductivity.

The curves C3 and C4 show that the inductive sensors 153, 154 placed at the centre are sensitive to the electrical properties and also (curve C4) to the position of the float 5. The increase in the frequency relative to the inductive sensor 153 is linked with the increase in conductivity and to a lesser degree to the level of the float. Furthermore, the substantial increase in the frequency relative to the inductive sensor 154 is mainly linked with the level of the float and to a lesser degree to the increase in conductivity.

Thus, knowing each of the sensitivities, for example using a liquid with known properties, the problem then consists of solving four equations with four unknowns.

Advantageously, the measurement device 1 further includes a temperature probe 35 for measuring the temperature of the liquid 9 to provide a corrective factor. The temperature probe 35 can be integrated in the float 5 and linked to an RFID tag 37. The temperature measurement provides an additional parameter and a correction factor enabling the microprocessor 19 to improve the precision of the density of the liquid 9 further according to the temperature.

To give an order of magnitude of the precisions that can be achieved, this method is conducted by varying the position of the float and hence the filling level of the receptacle using a micrometric screw for example. It is observed that the measurement is sensitive to very small level variations of the order of 1/10 mm.

Figure 5:
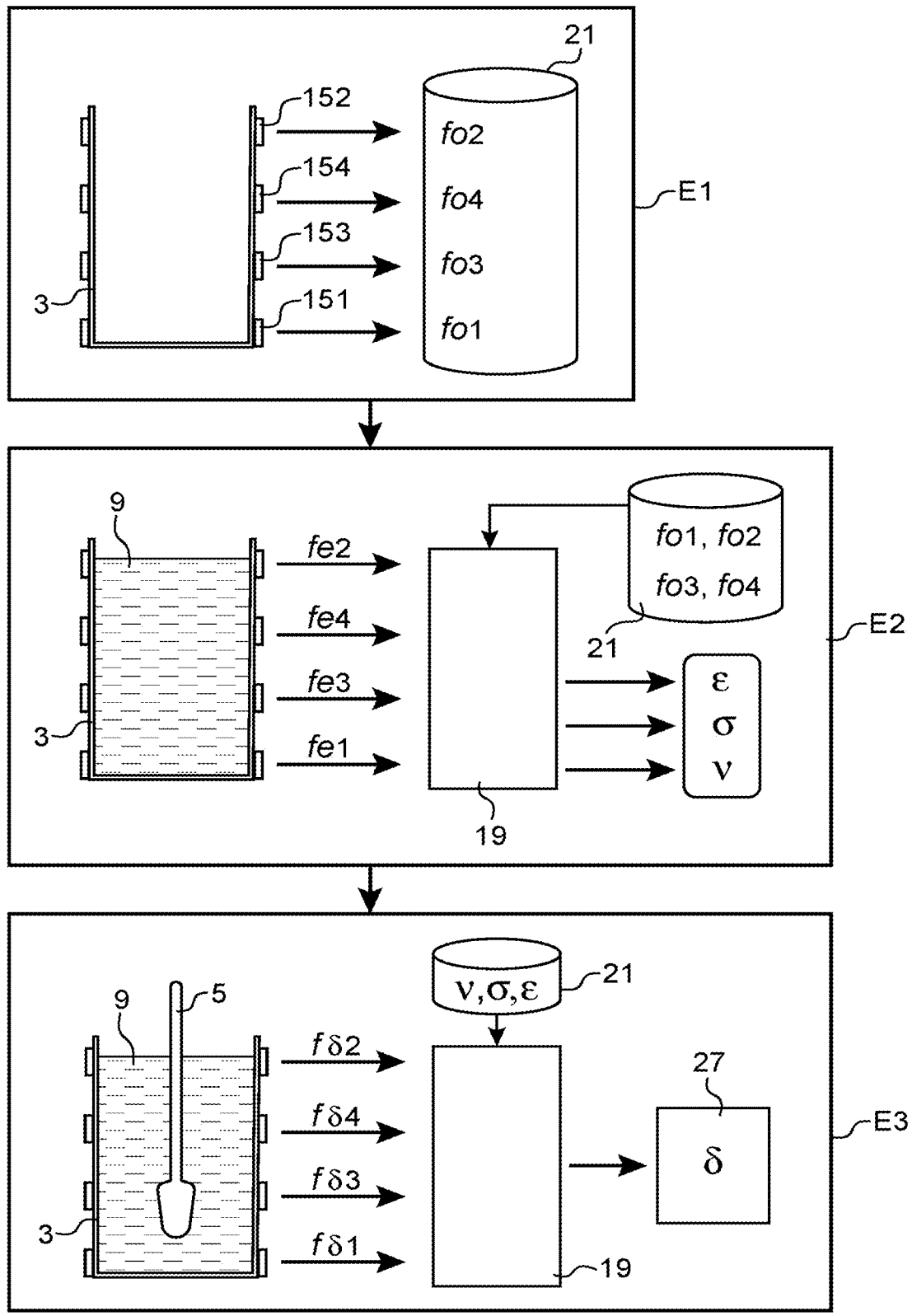
FIG. 5 illustrates an automatic liquid density measurement method using the detection device according to the first embodiment of the invention.

FIG. 5 illustrates an automatic liquid density measurement method using the detection device according to the first embodiment of the invention.

In the step E1, an empty measurement is made, i.e., the resonance frequencies are measured when the receptacle is empty in the cases of the first (FIG. 2) and third (see FIG. 7) embodiments or when the instrumented densitometer is placed in its case in the case of the second embodiment (FIG. 6).

Let fo1 and fo2 be the resonance frequencies measured by the electromagnetic sensors 151 and 152, fo3 and fo4 the resonance frequencies of the sensors 153 and 154. These values fo1, fo2, fo3, fo4 are stored in the memory 21.

In the step E2, the liquid 9 is poured into the receptacle 3 in such a way that the sensor 152 is partially submerged and the sensors 151, 153 and 154 are fully submerged.

The frequencies fe1, fe2, fe3 and fe4 measured by the sensors 151-154 will enable the microprocessor 19 to calculate the permittivity ε, the conductivity σ of the liquid and the volume V by solving a system of four equations with three unknowns:

$$\begin{bmatrix} f_{e1} \\ f_{e2} \\ f_{e3} \\ f_{e4} \end{bmatrix} = Se * \begin{bmatrix} V \\ \varepsilon \\ \sigma \end{bmatrix} + \begin{bmatrix} f_{o1} \\ f_{o2} \\ f_{o3} \\ f_{o4} \end{bmatrix}$$ [Math. 1]

where Se is a calibration matrix wherein the coefficients are predetermined during a prior calibration phase. For example, these coefficients of the matrix Se are determined using several mixtures of liquids with known electrical properties corresponding to the measurement range sought. Alternatively, several volumes of liquids corresponding to the sensitivity range of the electromagnetic sensor 152 are used.

The values of permittivity ε, conductivity σ and volume V of the liquid calculated by the microprocessor 19 are stored in the memory 21.

It will be noted that the step E2 only applies in the case of the first (FIG. 2) and third (FIG. 7) embodiments (i.e. receptacle or instrumented cover). In the case of the second embodiment (FIG. 6) relating to an instrumented densitometer, this step is advantageously omitted as it is not necessary to know the filling level of the receptacle.

In the step E3, the float 5 is submerged in the liquid 9 contained in the receptacle 3. The values of the frequencies fδ1, fδ2, fδ3 and fδ4 measured by the sensors 151-154 will vary according to the position of the float 5 and hence, the density δ of the liquid 9.

Then, a system of four equations with four parameters is obtained:

$$\begin{bmatrix} f_{\delta1} \\ f_{\delta2} \\ f_{\delta3} \\ f_{\delta4} \end{bmatrix} = S\delta * \begin{bmatrix} V \\ \delta \\ \varepsilon \\ \sigma \end{bmatrix} + \begin{bmatrix} f_{e1} \\ f_{e2} \\ f_{e3} \\ f_{e4} \end{bmatrix}$$ [Math. 2]

where Sδ is a calibration matrix wherein the coefficients are predetermined during a prior calibration phase using a liquid of known density.

Advantageously, all the measurements are made at a temperature close to that of the calibration. It is for example possible to use a temperature regulation system to keep the liquid 9 at a constant temperature.

Alternatively, the calibration can be conducted for several representative temperatures of the operating range thus forming a calibration matrix 56 according to the temperature T. Thus, the microprocessor 19 uses the calibration matrix 56 adapted to the temperature T by the temperature probe 35 integrated in the float 5.

The microprocessor 19 uses the values of permittivity ε, conductivity σ and volume V calculated and stored in memory in the preceding step as input data to calculate the density δ of the liquid 9. This gives four equations for an unknown 6 which will make it possible to improve or verify the precision of the density δ.

The density δ of the liquid 9 determined by the microprocessor 19 and, optionally, further data (for example, the temperature T, the permittivity ε, the conductivity σ and the volume displaced of the liquid 9) are displayed on the display screen 27.

Furthermore, the measurement device 1 can include fully submerged sensors at different depths, configured to measure a concentration gradient of the liquid.

Figure 6A:
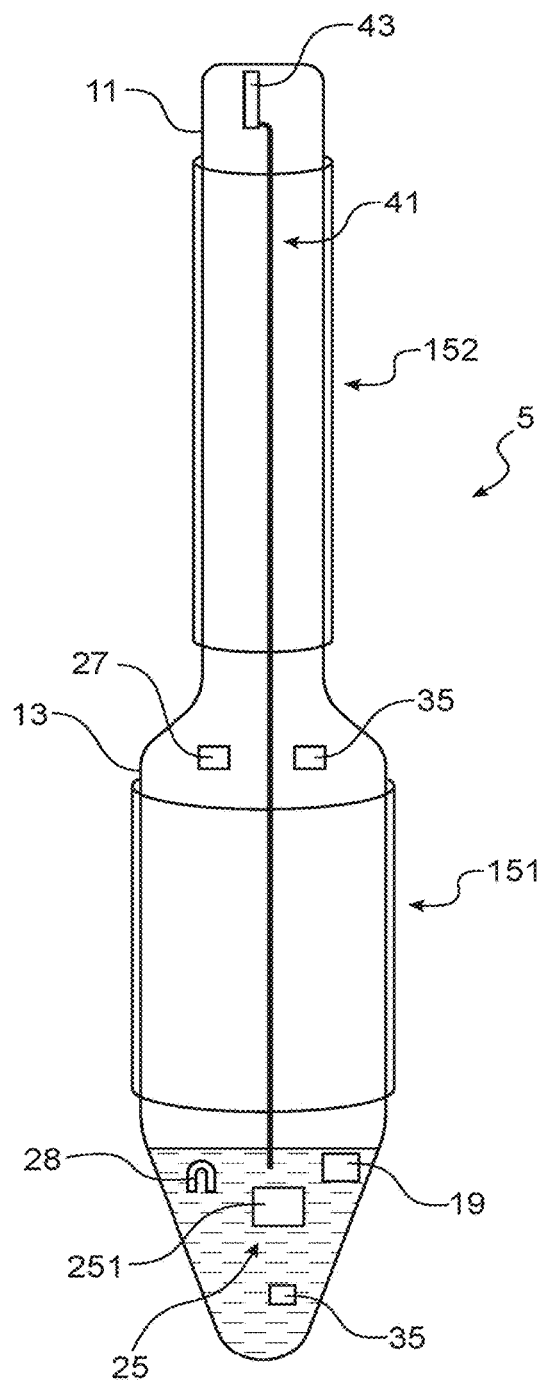
FIG. 6A.
Figure 6B:
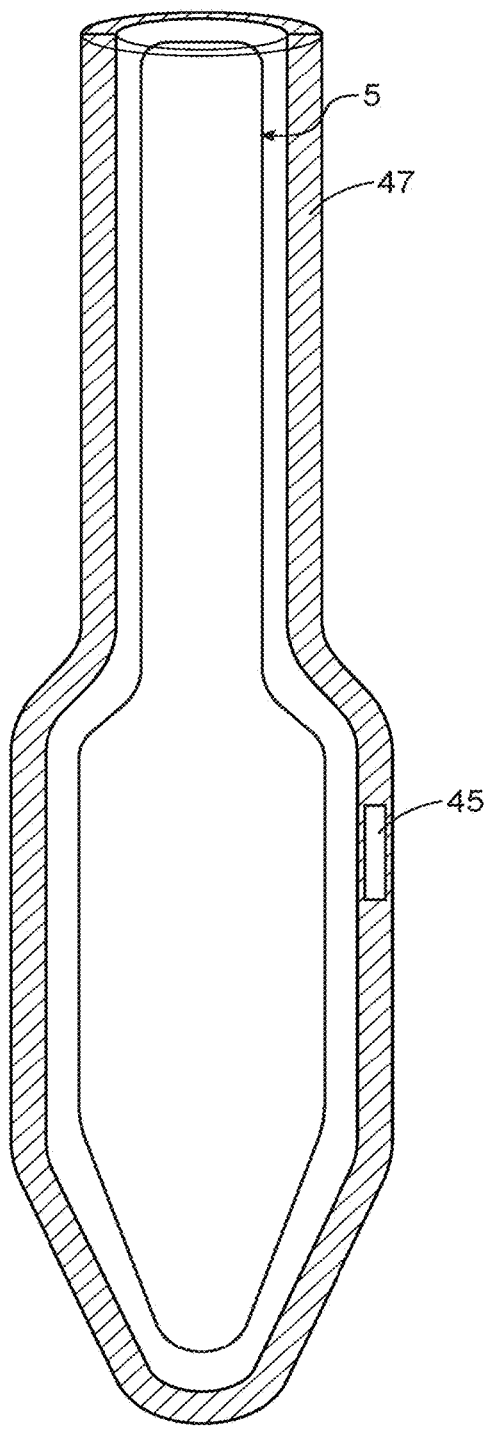
FIG. 6B illustrate very schematically an automatic liquid density measurement device, according to a second preferred embodiment of the invention.

FIGS. 6A and 6B illustrate very schematically an automatic liquid density measurement device, according to a second preferred embodiment of the invention.

According to this second embodiment, at least a part of the electronic system is integrated in the float 5 in such a way that the float thus instrumented becomes an automatic densitometer on its own.

For example, the instrumentation of the float 5 is conducted by integrating at least two electromagnetic sensors 151, 152 and by an electronic board. The latter can include a microcontroller or microprocessor 19, one or more temperature probes 35, a power management module 25, a motion sensor 27 and a wireless communication module 41. Advantageously, the sensitive elements are placed on the internal walls of the instrumented float 5. The float 5 can optionally be equipped with a magnet 28 acting as a stirrer. More specifically, the magnet 28 is comprised in the lower part of the plunger 13 making it possible to set the float in motion in order to stir the liquid. Advantageously, the magnet is a permanent magnet making it possible to act upon the position of the float 5 through an external action.

More specifically, the first electromagnetic sensor 151 is integrated in the plunger 13 in such a way that when the float 5 is introduced into the liquid 9, the active electrode of the first electromagnetic sensor 151 is located in the fully submerged part.

The second electromagnetic sensor 152 is integrated in the rod 11 of the float 5. In particular, the active electrode of the second sensor 152 is disposed all along the rod 11. Thus, when the float 5 is introduced into the liquid 9, the active electrode always includes a part partially submerged in the liquid. Thus, the second sensor 152 measures the level of submersion of the rod 11 and therefore of the volume of liquid displaced indicative of the density of the liquid.

In the same way as for the instrumentation of the receptacle 3 (FIG. 2), the first electromagnetic sensor 151 placed in the fully submerged part would make it possible to measure the electrical properties, whereas the second electromagnetic sensor 152 placed in the partially submerged portion of the float 5 would provide an indication of the floatation level and therefore of the density of the liquid.

Optionally, the plunger 13 can also integrate at least a part of the third and fourth electromagnetic sensors (not illustrated) disposed between the first and second sensors 151, 152.

Furthermore, the temperature probe(s) 35 integrated in the float 5 is(are) advantageously offset at the top and bottom of the wide part of the float 5 to measure any temperature gradient.

Moreover, the motion sensor 27 is for example an accelerometer which can be integrated in the submerged part of the float. This motion sensor 27 is configured to measure the motion of the float and indirectly that of the liquid and to supply this indirect information on the motion of the liquid to the microprocessor. Indeed, the liquid can be subjected to controlled stirring for example, by the stirring magnet 28. The microprocessor retrieves the measurements supplied by the accelerometer to calculate the viscosity of the liquid. Furthermore, the motion sensor 27 makes it possible to validate the measurements after a liquid stabilisation phase.

Advantageously, several sensors can also be integrated at different levels of the float to measure a concentration gradient of the liquid.

Moreover, the power management module 25 includes a battery 26 or another power supply means advantageously integrated in the plunger 13 of the float 5. According to the use, the autonomy required for the minimum duration of an acquisition will make it possible to dimension the power supply means. In the case where the electrical power supply is a battery 251, the latter is preferably disposed in the lower part to act as a ballast. In contrast, a remote power supply would be preferably located in the non-submerged part for example to transmit the power by means of a cover or case.

The wireless communication module 41 includes an antenna 43 integrated in the rod 11 of the float 5 and connected to the different sensors 151, 152 by means of the microcontroller 19. The antenna 43 is configured to transmit according to a low-power wireless communication system (for example: NFC, RFID, Bluetooth, Wi-Fi, etc.), the data relating to the measurements made by the sensors to a wireless communication device (for example, a computer, a smartphone or other device) comprising a microprocessor, a memory and an input/output interface.

It will be noted that according to the nature of the receptacle and the liquid, the measurement device 1 can be continuously remotely powered.

FIG. 6B shows that the measurement device 1 includes a calibration and inductive charging module 45 intended to calibrate the float 5 and remotely charge the battery integrated in the float. This calibration and charging module 45 can be advantageously comprised in a protective case 47 of the float 5.

The automatic liquid density measurement method using the detection device according to the second embodiment is similar to that described with reference to FIG. 5 except that here the step E2 is not applicable.

In this case, all the measurements and at least some of the calculations are onboard the float.

In particular, after inductive charging and self-calibration by means for example of the case 47, the float 5 is introduced into a receptacle 3 wherein the liquid of interest has previously been poured.

Introducing the float can disturb the liquid in which the stirring level is measured by the motion sensor 27. After the liquid has stabilised (indicated for example by constant values of the motion sensor 27), the microprocessor 19 uses the measurement of the electrical properties of the liquid made by the first sensor 151 as well as the measurement of the level of floatation made by the second sensor 152 to determine the density of the liquid.

Figure 7:
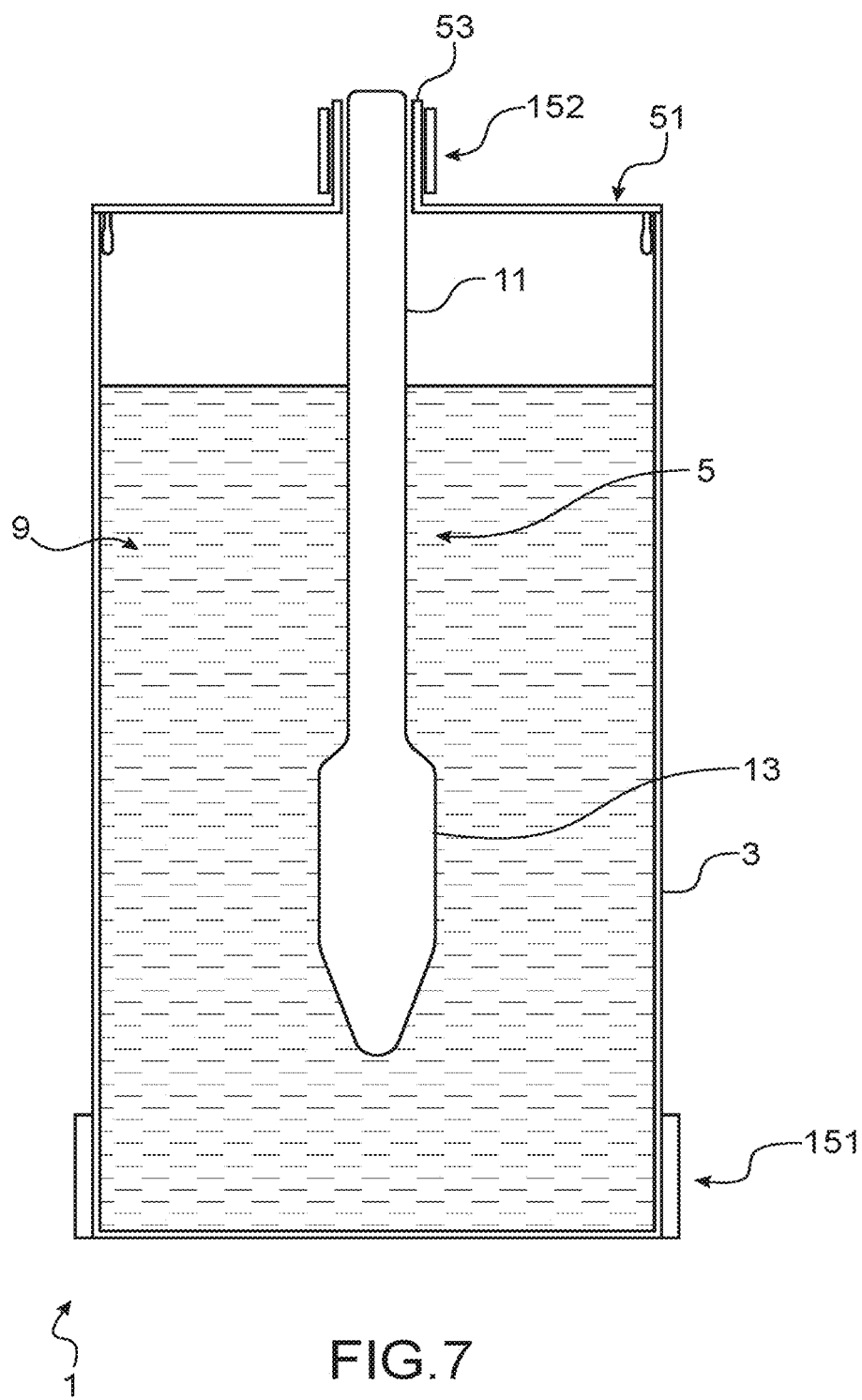
FIG. 7 illustrates very schematically an automatic liquid density measurement device, according to a third preferred embodiment of the invention.

FIG. 7 illustrates very schematically an automatic liquid density measurement device, according to a third preferred embodiment of the invention.

According to this third embodiment, the automatic measurement device includes a cover 51 instrumented with at least a part of the electronic system. The instrumented cover 51 is intended to be deposited on the opening of the receptacle 3. Furthermore, it comprises a tubular opening 53 intended to allow a part of the float 5 rod 11 through, so as to enable a remote power supply.

According to this embodiment, the second electromagnetic sensor 152 is disposed on the tubular opening 53 and the rod 11 of the float 5 is at least partially metallised. Moreover, the first electromagnetic sensor 151 can be disposed on the lateral surface and at the bottom of the receptacle 3 as in the first embodiment. Alternatively, the first electromagnetic sensor 151 can be integrated in the float as in the second embodiment.

In this embodiment, a remote power supply can be envisaged between the tubular opening 53 and the rod 11.

Obviously, various modifications can be made by a person skilled in the art to the invention described above, merely by way of non-limiting examples.

The invention claimed is:

1. An automatic liquid density measurement device, comprising:
   a receptacle configured to contain the liquid
   a float configured to be partially submerged in the liquid when it is contained in the receptacle, and
   an electronic system including:
      a first electromagnetic sensor configured to make a reference measurement relative to electrical properties of the liquid,
      a second electromagnetic sensor configured to make a measurement of a volume of liquid displaced when the float is submerged in the liquid, and
      an electronic circuit coupled with the first and second electromagnetic sensors to determine a density of the liquid based on a measurement of physical properties of the liquid and the measurement of the volume of the liquid displaced, the physical properties including conductivity and permittivity of the liquid.

2. The device according to claim 1, comprising at least one temperature probe.

3. The device according to claim 1, wherein each of the electromagnetic sensors includes a resonator having a resonance frequency which is dependent on an environment thereof, the resonator comprising an active reactance in a form of reactance electrode(s), the reactance electrode(s) being associated with a corresponding passive coupling element.

4. The device according to claim 3, wherein the first and second electromagnetic sensors include first and second reactance electrodes, the first and second reactance electrodes are disposed on a lateral surface of the receptacle, the first reactance electrode is disposed at a bottom of the receptacle and the second reactance electrode is disposed at a neck of the receptacle, the first electromagnetic sensor is configured to make a reference measurement, and the second electromagnetic sensor is configured to make a first measurement of a level of liquid in the receptacle in an absence of a float and to make a second measurement of the level of liquid in the receptacle when the float is submerged in the liquid.

5. The device according to claim 3, wherein the reactance electrodes include first and second reactance electrodes comprising capacitive electrodes formed by armatures.

6. The device according to claim 5, further comprising third and fourth electromagnetic sensors comprising third and fourth reactance electrodes respectively.

7. The device according to claim 6, wherein the third and fourth reactance electrodes are inductive electrodes formed by first and second coils respectively.

8. The device according to claim 6, wherein the third and fourth reactance electrodes are disposed on a lateral surface of the receptacle at intermediate levels between the first and second reactance electrodes.

9. The device according to claim 1, wherein the electronic system further includes an antenna and a battery and in that at least a part of the electronic system is integrated in the float.

10. The device according to claim 9, comprising a motion sensor configured to measure a motion of the liquid.

11. The device according to claim 9, comprising a calibration and inductive charging module configured to calibrate the float and to remotely charge the battery incorporated in the float, the calibration and inductive charging module being comprised in a protective case of the float.

12. The device according to claim 9, wherein the float comprises a plunger and a float rod, the plunger incorporates the battery and the first electromagnetic sensor, and the float rod incorporates the antenna and the second electromagnetic sensor.

13. The device according to claim 12, comprising a cover configured to be deposited on an opening of the receptacle, the cover comprising a tubular opening configured to allow a part of the float rod of the float through, and the second electromagnetic sensor being disposed on the tubular opening and the float rod of the float being at least partially metallised.

14. An automatic liquid density measurement method, comprising:
  pouring the liquid into a receptacle,
  using a first electromagnetic sensor to make a reference electromagnetic measurement relative to electrical properties of the liquid contained in the receptacle,
  using a second electromagnetic sensor to make a first electromagnetic measurement of a level of the liquid in the receptacle,
  introducing a float into the liquid contained in the receptacle so as to be partially submerged in the liquid,
  using the second electromagnetic sensor to make a second electromagnetic measurement of the level of the liquid in the receptacle, and
  using a microprocessor to determine a density of the liquid according to measurement of physical properties of the liquid and the first and second level measurements, the physical properties including the conductivity and permittivity of the liquid.

15. The method according to claim 14, wherein the first and second electromagnetic sensors are disposed on the receptacle.

16. The method according to claim 14, wherein the first and second electromagnetic sensors are integrated in the float and the method further includes:
  inductively charging and calibrating the float,
  making a stabilisation measurement of the liquid by a motion sensor integrated in the float, and
  determining the density of the liquid by the microprocessor after the liquid has stabilised.

* * * * *